(12) United States Patent
Ben Ayun et al.

(10) Patent No.: US 8,995,512 B2
(45) Date of Patent: Mar. 31, 2015

(54) ADAPTIVE OFF-CHANNEL DETECTOR FOR RECEIVERS

(75) Inventors: Moshe Ben Ayun, Shoham (IL); Ricardo Franco, Plantation, FL (US); Ovadia Grossman, Tel Aviv-Yaffo (IL); Mark Rozental, Gedera (IL); Uri Vallach, Petah Tikva (IL)

(73) Assignee: Motorola Solutions, Inc., Schaumburg, IL (US)

( * ) Notice: Subject to any disclaimer, the term of this patent is extended or adjusted under 35 U.S.C. 154(b) by 58 days.

(21) Appl. No.: 13/825,216

(22) PCT Filed: Sep. 2, 2011

(86) PCT No.: PCT/US2011/050291
§ 371 (c)(1),
(2), (4) Date: Mar. 20, 2013

(87) PCT Pub. No.: WO2012/050681
PCT Pub. Date: Apr. 19, 2012

(65) Prior Publication Data
US 2013/0177060 A1    Jul. 11, 2013

(30) Foreign Application Priority Data

Sep. 29, 2010   (GB) .................................. 1016361.6

(51) Int. Cl.
*H04B 3/46*   (2006.01)
*H04B 17/00*  (2006.01)
(Continued)

(52) U.S. Cl.
CPC ............ *H04L 1/0036* (2013.01); *H04B 1/1027* (2013.01); *H04B 1/109* (2013.01); *H04B 1/12* (2013.01)

USPC .......................................... 375/224; 375/231

(58) Field of Classification Search
CPC ......... H04B 1/109; H04B 1/1027; H04B 1/12
See application file for complete search history.

(56) References Cited

U.S. PATENT DOCUMENTS 6,832,080 B1   12/2004  Arslan et al.
7,227,916 B2    6/2007  Ruelke et al.
(Continued)

FOREIGN PATENT DOCUMENTS

GB           2460274 A    11/2009
KR    10-2007-0095350 A    9/2007

OTHER PUBLICATIONS

PCT International Search Report Dated Apr. 12, 2012 for Counterpart Application PCT/US2011/050291.
(Continued)

*Primary Examiner* — Erin File
(74) *Attorney, Agent, or Firm* — Daniel R. Bestor (57) ABSTRACT

Receivers (500) and methods of adaptively adjusting the receivers based on a received interferer are described. The peak-to-average ratio of a received signal is used to determine the type of interferer. The ratio and interferer type, in addition to the type of on-channel signal, are used to select parameters to adjust the decay time of a peak detector (516), and the threshold and hysteresis of a comparator (518). The peak detector (516) and comparator (518) are used to generate an off-channel flag that indicates the presence of a relatively strong interferer to other modules in the receiver (500). If valid data is not present a default set of parameters is provided. The ratio is determined by dividing the maximum peak over the average or a range of ratios is determined by comparing a scaled value of the average to different scaled values of the peak.

19 Claims, 7 Drawing Sheets

(51) Int. Cl.
*H04Q 1/20* (2006.01)
*H04L 1/00* (2006.01)
*H04B 1/10* (2006.01)
*H04B 1/12* (2006.01)

(56) References Cited

U.S. PATENT DOCUMENTS

| | | | |
|---|---|---|---|
| 7,373,125 | B2 | 5/2008 | Godambe et al. |
| 8,229,368 | B1* | 7/2012 | Immendorf et al. ............ 455/78 |
| 8,442,474 | B2 | 5/2013 | Rao et al. |
| 2003/0045314 | A1* | 3/2003 | Burgan et al. ................ 455/517 |
| 2004/0132410 | A1* | 7/2004 | Hundal et al. ............. 455/67.13 |
| 2004/0152432 | A1* | 8/2004 | Gu ................................ 455/136 |
| 2005/0026564 | A1* | 2/2005 | Haub et al. ................. 455/67.11 |
| 2005/0226269 | A1 | 10/2005 | Seo et al. |
| 2006/0071078 | A1* | 4/2006 | Olmstead ................. 235/462.01 |
| 2006/0089103 | A1 | 4/2006 | Osburn |

OTHER PUBLICATIONS

International Preliminary Report on Patentability and Written Opinion for International Patent Application No. PCT/US2011/050291 issued Apr. 2, 2013.

* cited by examiner

ADAPTIVE OFF-CHANNEL DETECTOR FOR RECEIVERS

CROSS-REFERENCE TO RELATED APPLICATIONS

This application claims priority to GB Application Serial Number GB 1016361.6 filed Sep. 29, 2010 and PCT Application Serial Number PCT/US2011/050291 filed Sep. 4, 2011, entitled "Adaptive Off-Channel Detector for Receivers," the contents of both of which are expressly incorporated herein by reference in their entirety.

TECHNICAL FIELD

The present invention relates to a demodulation apparatus and associated method for demodulating a received signal in a receiver in which distortion artifacts generated by phase and amplitude imbalance between the complex IQ constituent elements of the signal are minimized.

BACKGROUND

Wireless communication systems operate using information modulated onto a radio frequency (RF) carrier to form an RF signal that is subsequently transmitted over a channel. Often the RF signals are formed from in-phase (I) and quadrature-phase (Q) signal components. The RF signal is received by a radio receiver, and the modulated information contained in the RF signal is demodulated to recover the desired information. Demodulation strategies are well known in the art; however receiver topologies generally introduce noise or distortion into the demodulated signal. The amount of noise or distortion depends on the specifics of the receiver configuration and the type of information modulated into the signal.

Direct Conversion Receivers (DCRs) are incorporated into many communication systems as the receiver topology of choice because of their relatively low cost, small size, and operational flexibility over a wide range of channel spacing (i.e., the frequency difference between adjacent channels used to transmit data). A receiver is referred to as a DCR if the down conversion mixer is sourced by a Local Oscillator (LO) having a frequency approximately equal to the desired RF carrier frequency, thereby converting the received RF signal to a baseband signal. A DCR receiver may also include receiver systems where the frequency difference between the LO and the desired RF carrier signal is less than several hundred kiloHertz (kHz) which may also be called a Very Low Intermediate Frequency (VLIF) configuration for the DCR topology.

However, because of the direct conversion to baseband, DCRs are more sensitive to interferers (interference signals) than receivers that modulate to baseband in intermediate steps. For example, DCRs are sensitive to constant envelope (both TDMA and continuous) interferers that cause DC offsets at baseband. DCRs are also sensitive to interferers having non-constant envelopes, which cause distortion due to the second-order term of the polynomial that models the DCR nonlinear response. DCRs are designed to have a high second order intercept point to increase rejection of the second-order distortion terms. It is thus desirable to design a DCR and reception method that provides improved rejection of the interferers.

SUMMARY

In a first embodiment, there is provided a method of adaptively adjusting a receiver depending on an interferer as defined in claim C of the accompanying claims.

In a second embodiment, there is provided a receiver as defined in Claim 14 of the accompanying claims.

Further embodiments are as defined in the accompanying dependent claims and are disclosed in the embodiments described below.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Receivers and methods of adaptively adjusting the receivers based on a received interferer are disclosed. A signal metric such as the peak-to-average ratio is used to determine the type of interferer. The signal metric and the type of interferer, in addition to the type of on-channel signal expected to be received, are used to select parameters from a lookup table to use in other modules of the receiver, such as a peak detector and comparator. One or more characteristics of each of the other modules are adjusted dependent on the selected parameters. The other modules are used to generate an off-channel flag that indicates the presence of a relatively strong interferer. In particular examples, the decay time of the peak detector, and the threshold and hysteresis of the comparator are adjusted by the parameters. If valid data is not present (e.g., an off timeslot of a TDMA signal), for example, a default set of parameters are provided to the modules. The peak-to-average ratio can be determined using analog or digital means. The peak-to-average value may be determined directly through dividing the maximum peak over the average or a range of values may be determined by comparing a scaled value of the average to different scaled values of the peak.

Figure 1:
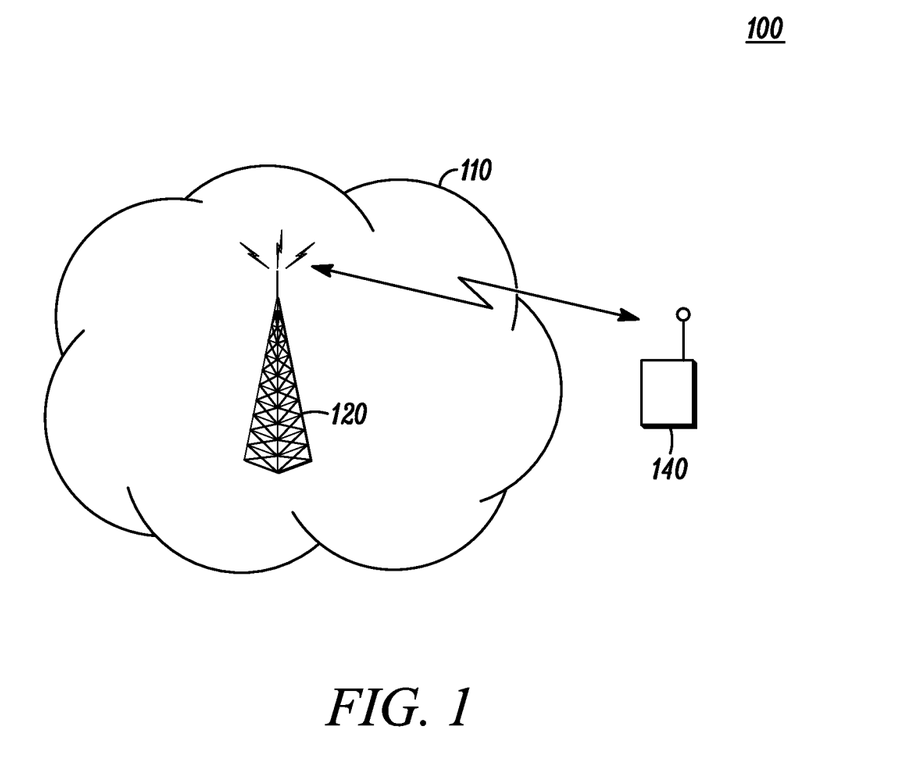
FIG. 1 illustrates an embodiment of a communication system.

FIG. 1 illustrates a general network 100 that includes an infrastructure 110. There are many distributed elements in the infrastructure 110, some local to each other others disposed geographically distant from each other. Such elements include a base station 120, which provides connectivity for a portable communication device 140 disposed within the coverage area serviced by the base station 120 to other devices either in the same coverage area or in a different coverage area through the infrastructure 110. The portable communication device 140 can be, for example, a cellular telephone, personal digital assistant, or a communication device used by emergency personnel.

Figure 2:
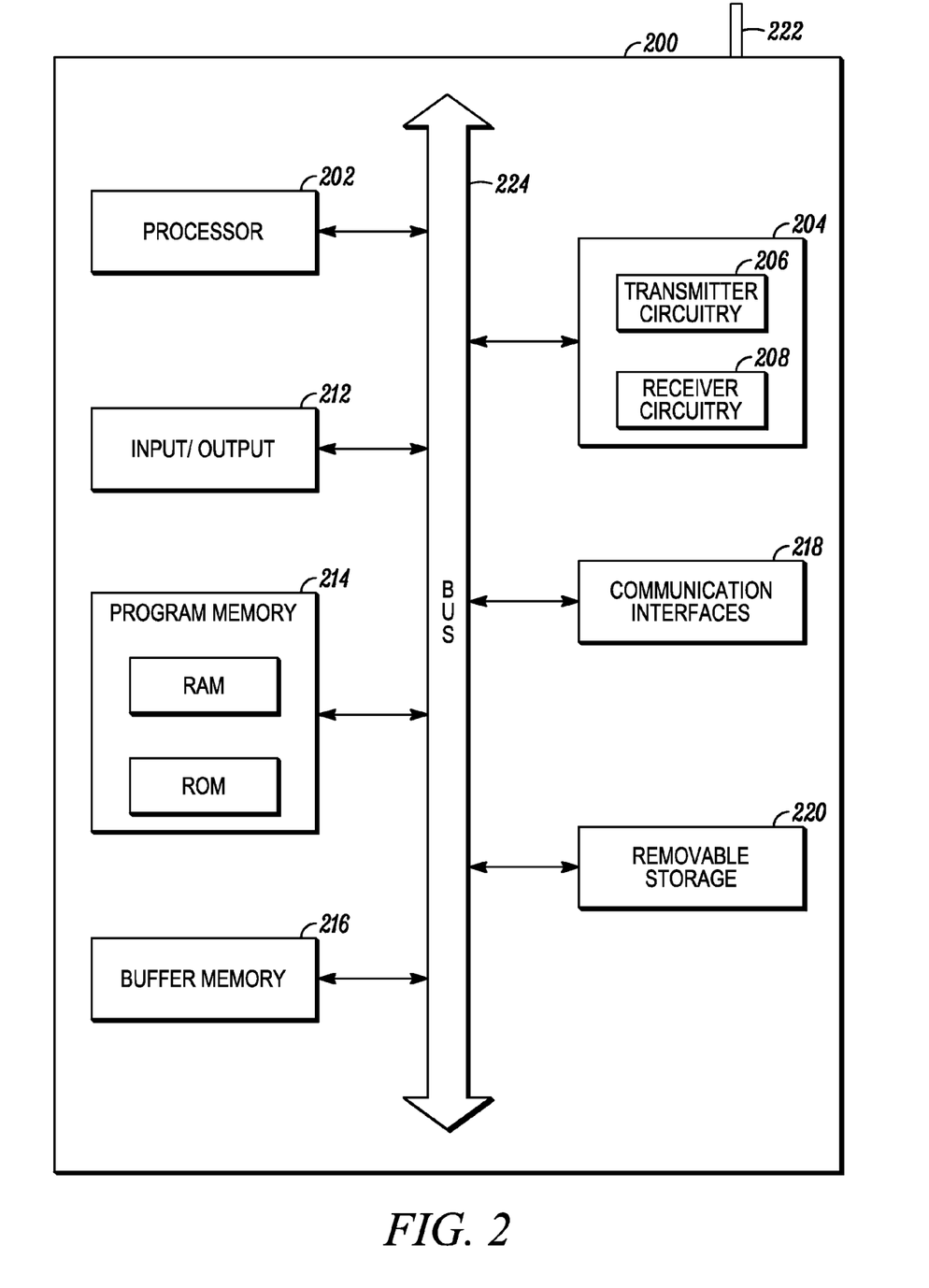
FIG. 2 illustrates an internal block diagram of an embodiment of a communication device.

An embodiment of one such communication device, such as the base station 120, is shown in the block diagram of FIG. 2. The base station 200 may contain, among other components, a processor 202, a transceiver 204 including transmitter circuitry 206 and receiver circuitry 208, an antenna 222, I/O devices 212, a program memory 214, a buffer memory 216, one or more communication interfaces 218, and removable storage 220. The base station 200 is preferably an integrated unit and may contain at least all the elements depicted in FIG. 2 as well as any other element necessary for the base station 200 to perform its electronic functions. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are stored in the program memory 214 and may include instructions such as estimation and correction of a received signal and encryption/decryption that are executed by the processor 202 as well as information related to the transmit signal such as modulation, transmission frequency or signal amplitude. The program memory 214 may be an IC memory chip containing any form of random access memory (RAM) and/or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the base station 200 are described in detail below.

The transmitter circuitry 206 and the receiver circuitry 208 enable the base station 200 to respectively transmit and receive communication signals. In this regard, the transmitter circuitry 206 and the receiver circuitry 208 include appropriate circuitry to enable wireless transmissions. The implementations of the transmitter circuitry 206 and the receiver circuitry 208 depend on the implementation of the base station 200 and the devices with which it is to communicate. For example, the transmitter and receiver circuitry 206, 208 may be implemented as part of the communication device hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding. The buffer memory 216 may be any form of volatile memory, such as RAM, and is used for temporarily storing received or transmit information.

The base station 200 may also contain a variety of I/O devices such as a keyboard with alpha-numeric keys, a display (e.g., LED, OELD) that displays information about the base station or communications connected to the base station, soft and/or hard keys, touch screen, jog wheel, a microphone, and a speaker. Again, although the device discussed with relation to the figures is specifically referred to the base station, other communication devices that employ a power amplifier may be used.

Figure 3:
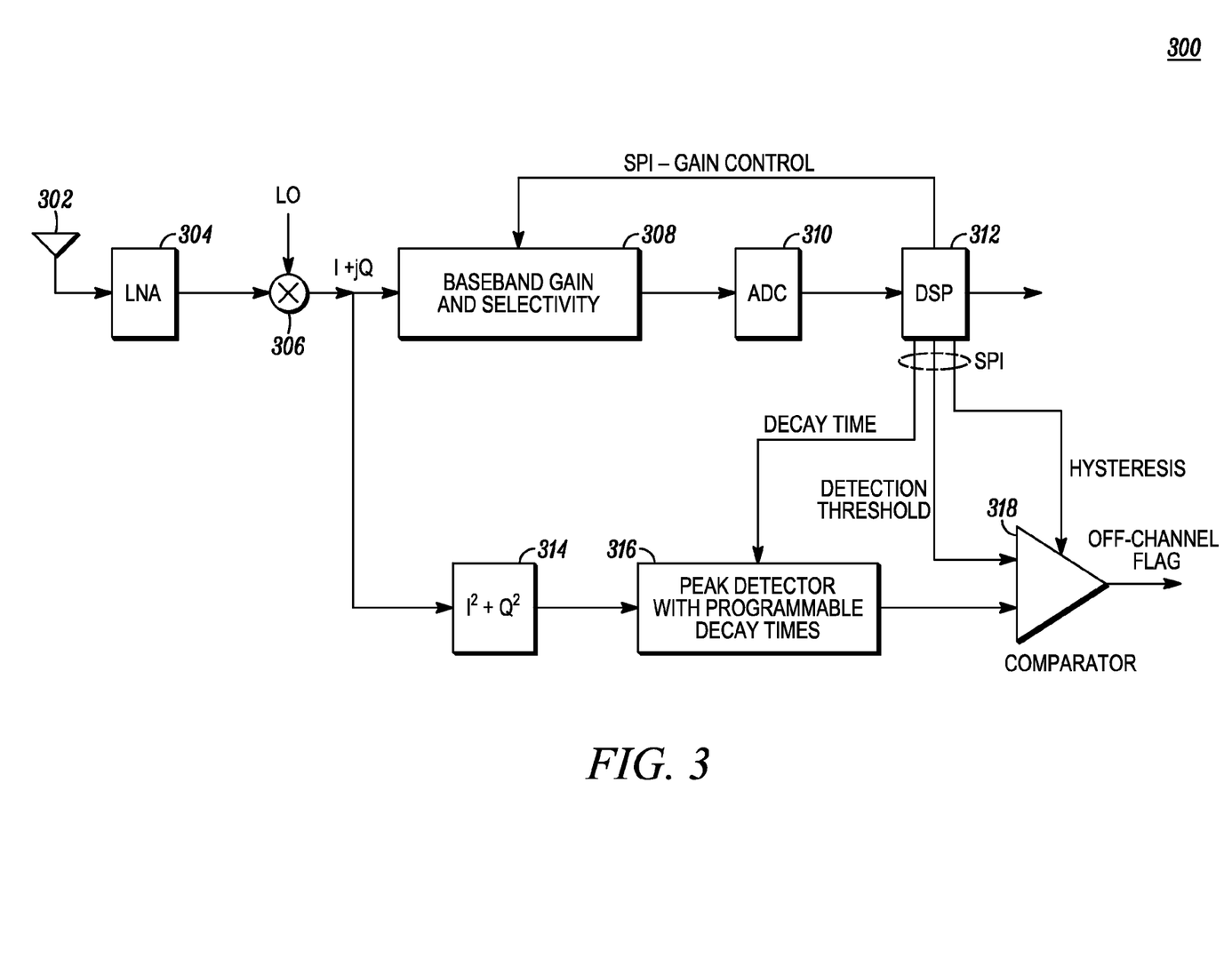
FIG. 3 shows one embodiment of a block schematic diagram of a receiver.

FIG. 3 depicts one embodiment of a block schematic diagram of a receiver 300. As shown, an RF signal is received by an antenna 302 and subsequently amplified using a low noise amplifier (LNA) 304. The RF signal is down-converted by a quadrature mixer 306, which is supplied with a LO signal from a local oscillator (not shown). Although not shown quadrature mixer 306 contains two mixers: an I mixer for 1 (in-phase) path and a Q mixer for the Q (quadrature) path. The LO signal supplied to the Q mixer is phase shifted, by a phase shifter, by 90 degrees relative to LO signal supplied to the I mixer. The LO signal has a frequency at or close to (within a fraction of a kHz) the frequency of the RF signal and thus the RF signal is converted to baseband. The baseband signal contains complex IQ signals and may represent any complex signal format as may be incorporated into the receiver, for example, single-ended time varying analog signals, differential signals in which I represents a signal pair I and Ix, Q represents a signal pair Q and Qx, (where Ix and Qx are phase shifted from the I and Q signals by 180°), or digital representations of the sampled received IQ signals. The baseband signals are supplied to various discrete or integrated blocks that provide a variable amount of gain/attenuation and filtering (such as low pass filtering), shown in FIG. 3 as baseband gain and selectivity block 308. The resulting signal is digitized at an analog-to-digital converter (ADC) 310 and supplied to a digital signal processor (DSP) 312. On-channel detection and amplification adjustment blocks such as a decimate-and-scale, finite input response (FIR) or infinite impulse response (IIR) filters, DC Offset correction, and separate state machines are not shown for convenience, but descriptions of these and other elements that may be present (as well as determination of on-channel signal strength) may be found in, for example, U.S. patent application Ser. No. 12/844,961, filed Jul. 28, 2010, entitled "Method And Apparatus For Imbalance-Free FM Demodulation In Direct Conversion Radio Receivers" and GB2460274, filed May 23, 2008, entitled "Radio Frequency Receiver, Wireless Communication Unit And Method Of Operation," both of which are herein incorporated by reference in its entirety.

An estimate of the instantaneous energy of the baseband complex signal, prior to amplifying and filtering the signal, is determined by an energy estimator 314. The unfiltered baseband signal from the quadrature mixer 306, whose energy is estimated by the energy estimator 314, thus contains the on-channel (desired) signal along with unwanted off-channel noise. The instantaneous energy is defined by the sum of the squared individual components of the complex signal ($I^2 + Q^2$). The estimate from the energy estimator 314 is an analog voltage (that may in some embodiments be converted to a digital signal) proportional to the energy. The instantaneous power of the signal is defined by taking the square root of the instantaneous energy.

The estimation is supplied to a peak detector 316 that has a fast attack time and a slow programmable decay time. Fast attack time refers to the ability of the peak detector to follow envelope peaks. A slow decay indicates that the peak detector does not follow envelope deeps. For example, for Tetra2 150 kHz channel slow decay time may be set for 3 msec (RC time constant). The peak detector 316, in one embodiment, is a filter that has a decay constant determined by the time constant of the RC components therein. The peak voltage thus slowly decays at the peak detector 316. The peak detector 316 is programmable. For example, in one embodiment the capacitor is variable and thus the decay constant of the peak detector 316 is programmable.

The output from the peak detector 316 is provided to a comparator 318, where it is compared to a predetermined threshold. The comparator 318 contains hysteresis. Both the threshold and the amount of hysteresis are programmable. The threshold is related to, e.g., proximity of the LNA 304 to compression or is determined during receiver development based on the receiver IP2 ($2^{nd}$ order Intercept Point). For example if the threshold is determined based on the LNA 304 or the front end compression caused by other elements, 0 dB below compression may be a first threshold, 3 dB below compression may be a second threshold, 6 dB below compression may be a third threshold, etc. . . . If the thresholds are determined based on the receiver IP2, the thresholds are determined based on the expected $2^{nd}$ order products in the receiver passband due to interferers. IP2 [dBm]=$P_{in}$[dBm]+ IMR2[dB]. $P_{in}$ is the interferer power at the receiver input in dBm and IMR2 is the intermodulation in dB. If, for example, the receiver IP2 is +60 dBm, then for an interferer at −20 dBm: IMR2=IP2-$P_{in}$=+60 dBm-(−20 dBm)=80 dB. This means that the intermodulation product at the receiver input will be at −20 dBm−80 dB=−100 dBm. If the receiver sensitivity is −115 dBm, then the intermodulation due to IP2 has degraded the receiver sensitivity. In this example, the off-channel detector threshold could be set for −25 dBm at the receiver input. Hysteresis is employed so that if the voltage supplied to the peak detector 316 oscillates around the threshold by a small amount, the output from the comparator 318 does not keep varying repeatedly. The output of the comparator 318 is an off-channel flag that is high when a strong off-channel signal is detected.

In one embodiment, the DSP 312 supplies control signals through a set of Serial Port Interface (SPI) signals. For example, the DSP 312 may control the gain settings in the baseband gain and selectivity block 308 and/or LNA 304. The DSP 312 also provides the control signals to the peak detector 316 and comparator 318 setting their decay time, detection threshold and hysteresis.

As above, the comparator 318 provides an off-channel flag, which is used to signal to other parts of the receiver 300 when a significant level of off-channel signals is present. Off-channel signals cause significant noise and thus are a main contribution to degradation of the receiver dynamic range, the off-channel flag is used to improve the dynamic range of the receiver. The off-channel flag can be used as a trigger for receiver Automatic Gain Control (AGC) activation or for front end linearity (e.g., setting a compression of 1 dB) improvement by increasing the front end current drain or for dynamic DC compensation algorithm activation. The lower amplification can be provided by reducing the amplification provided by a variable gain amplifier, increasing the attenuation of variable attenuators, or activating/deactivating various amplifiers or attenuators in the upper signal path.

However, while merely signaling that a strong off-channel signal exists and taking appropriate action is desirable, improved results can be obtained by employing an adaptive system. Specifically, various types of interferers may exist in a communication network (e.g., AM, FM, Tetra1, Iden, Tetra2), each with its own modulation and other characteristics such as continuous or discontinuous (TDMA) transmission. The different interferers introduce varying types of distortion. Using a single set of decay times, detection thresholds and hysteresis does not result in the optimal stable and repeatable off-channel flag response. Using only one set of correction factors is optimal for only one specific type of interferer. This results in reduced system performance when the other types of interferers are present. For example, simulations and measurements have shown that when the off-channel detector settings are optimized for a Tetra2 150 kHz interferer and the flag is high and stable, when same power CW interferer is present, the off-channel flag does not indicate the presence of an interferer. Instead, the CW interferer power must be increased by 10 dB for the flag to go high. Similarly, when a 50 Hz AM modulated slotted interferer is present, the off-channel flag toggles between high and low but takes a relatively long time (1.45 ms) as the optimal decay time for the Tetra2 interferer is 3.2 ms. Under certain circumstances, this flag switching delay can increase to almost half of timeslot in which data is being provided, making it nearly impossible to activate dynamic DC compensation based on the off-channel flag. For other off-channel detector settings, simulations have shown that if set for a CW interferer but a same power Tetra2 16QAM 150 KHz signal interferer is present, the flag is unstable between −15.5 dBm and −31.4 dBm leaving about a 16 dB zone of instability. Thus, it is desirable to further modify the receiver of FIG. 3 by incorporating a DC compensation algorithm that dynamically adapts in real time to the type of interferer. In particular, the adaptive system uses different off-channel detector settings for different off-channel interferers, different off-channel detector settings for different desired on-channel signals (e.g., Tetra1, FM, Tetra2 150 kHz), and determines the type of interferer for programming the off-channel detector settings based on off-channel signal envelope metrics and whether the interferer is TDMA or continuous. In various embodiments, the metrics include peak to average ratio, peak to deep ratio, deep to average ratio, amplitude variance, and/or amplitude zero crossings.

Figure 4:
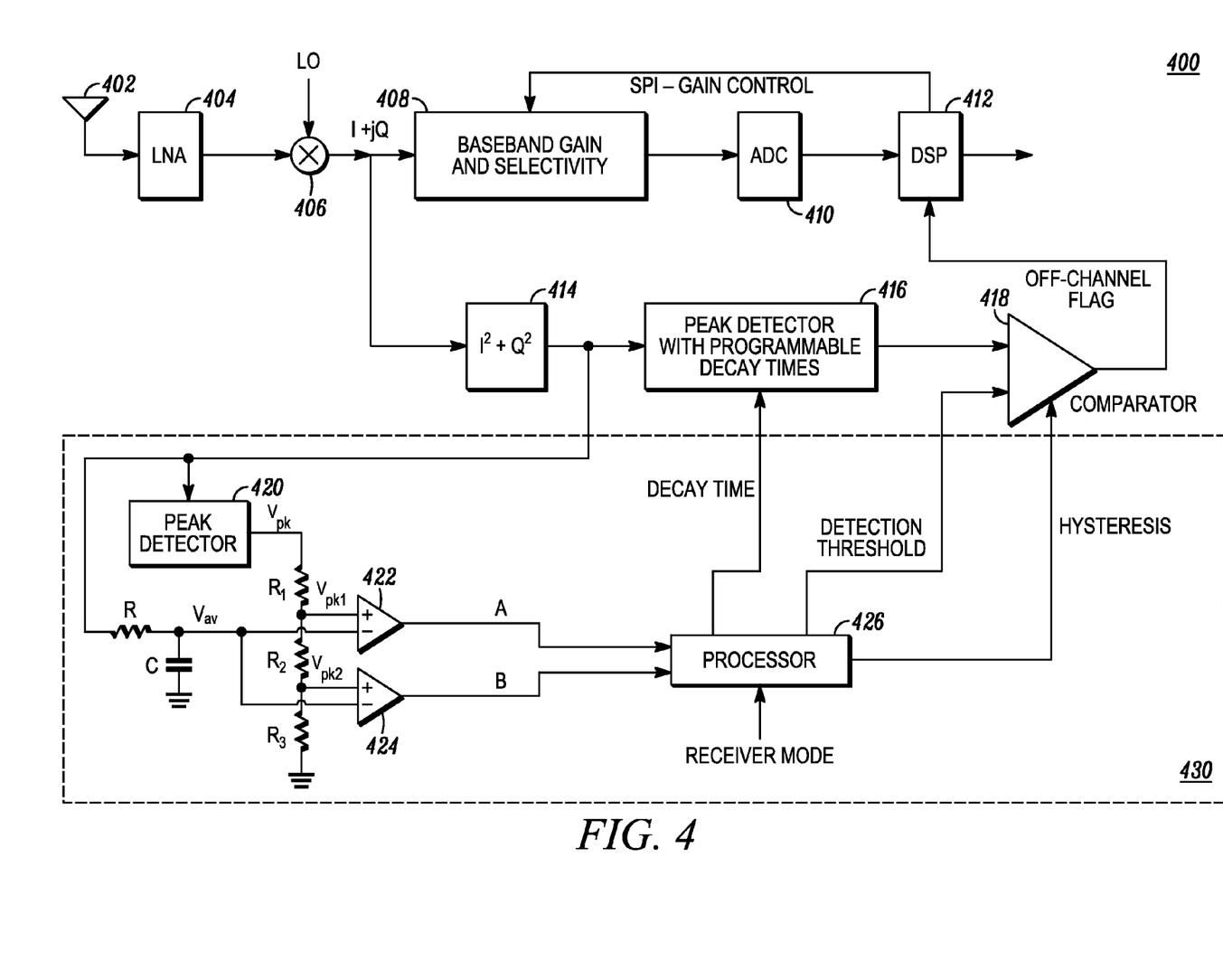
FIG. 4 shows an analog embodiment of a receiver containing an adaptive system.

One embodiment of a receiver using an adaptive system is shown in FIG. 4 in which the peak to average ratio of the off-channel signal envelope is used as the metric. Similar to FIG. 3, the receiver 400 contains an antenna 402 that receives signals and a LNA 404 that amplifies the received signals. The RF signals are down-converted at a quadrature mixer 406, whose resulting signal is digitized at an ADC 410 and supplied to a DSP 412. On-channel detection and amplification adjustment blocks are again not shown for convenience.

The baseband signal from the quadrature mixer 406 is supplied to an energy estimator 414, which provides an estimate of the instantaneous energy of the baseband signal. The estimation is supplied to first and second peak detectors 416, 420. The first peak detector 416 is programmable. The output from the first peak detector 416 is provided to a comparator 418 that contains hysteresis. Both the threshold and the amount of hysteresis are programmable. The threshold is again related to the remaining system margin.

The second peak detector 420 is not programmable. The output of the second peak detector 420, $V_{pk}$, is provided to a voltage divider containing multiple resistors ($R_1$, $R_2$, $R_3$) having the same or different resistances. Nodes between the first and second resistors $R_1$, $R_2$ (which supplies first intermediate peak voltage $V_{pk1}$) and between the second and third resistors $R_2$, $R_3$ (which supplies second intermediate peak voltage $V_{pk2}$) are each coupled to an input of a different comparator 422, 424. The other inputs of the comparators 422, 424 are connected to an RC circuit that supplies the average value of the instantaneous energy. Thus, the comparators 422, 424 effectively compare the average instantaneous energy to different peak voltages so that the comparators 422, 424 are triggered at different times.

As shown in FIG. 4, the outputs A, B from the comparators 422, 424 are 0 when the average energy is greater than $V_{pk1}$ (i.e., very low peak/average ratio); the output A from the first comparator 422 is 1 while the output B from the second comparator 424 is 0 when the average energy is less than $V_{pk1}$ and than greater $V_{pk2}$ (i.e., low peak/average ratio); and the outputs A, B from the comparators 422, 424 are 1 when the average energy is less than $V_{pk2}$ (i.e., high peak/average ratio). The outputs A, B from the comparators 422, 424 are provided to a processor 426. The processor 426 adjusts the decay time of the first peak detector 416 and the predetermined threshold and the amount of hysteresis of the comparator 418 dependent on the outputs A, B from the comparators 422, 424. The second peak detector 420, RC circuitry, comparators 422, 424, and processor 426 form an analog adaptive block 430.

Although not shown, as in FIG. 3 the DSP 412 may provide SPI signals to the first peak detector 416 and comparator 418 to provide a default set of parameters for these blocks for legacy reasons. However, the SPI signals from the DSP 412 are able to be overridden by the SPI signals from the adaptive block 430. As above, the processor 426 settings are also influenced by the desired on-channel signal, which the receiver 400 can be manually set to receive. Alternatively, the type of on-channel signal can be determined by the DSP 412.

The processor 426 thus provides different sets of correction factors (programmable decay times, detection thresholds and hysteresis) to be employed by the first peak detector 416 and comparator 418. The particular set used depends on the results from the comparators 322, 324. These sets of programmable factors are determined prior to shipping the receiver 300 to a user/destination and are thus predefined based on design and are set by the manufacturer.

In the embodiment shown in FIG. 4, the adaptive block 430 is analog. In another embodiment, shown in FIG. 5, the adaptive block 530 is digital. Similar to FIG. 4, the receiver 500 contains an antenna 502 that receives signals and a LNA 504 that amplifies the received signals. The RF signals are down-converted at a quadrature mixer 506, whose resulting signal is digitized at an ADC 510 and supplied to a DSP 512. The baseband signal from the quadrature mixer 506 is supplied to an energy estimator 514. The estimation from the energy estimator 514 is supplied to a peak detector 516. The output from the peak detector 516 is provided to a comparator 518 that contains hysteresis. As above, both the threshold and the amount of hysteresis are programmable.

Figure 5:
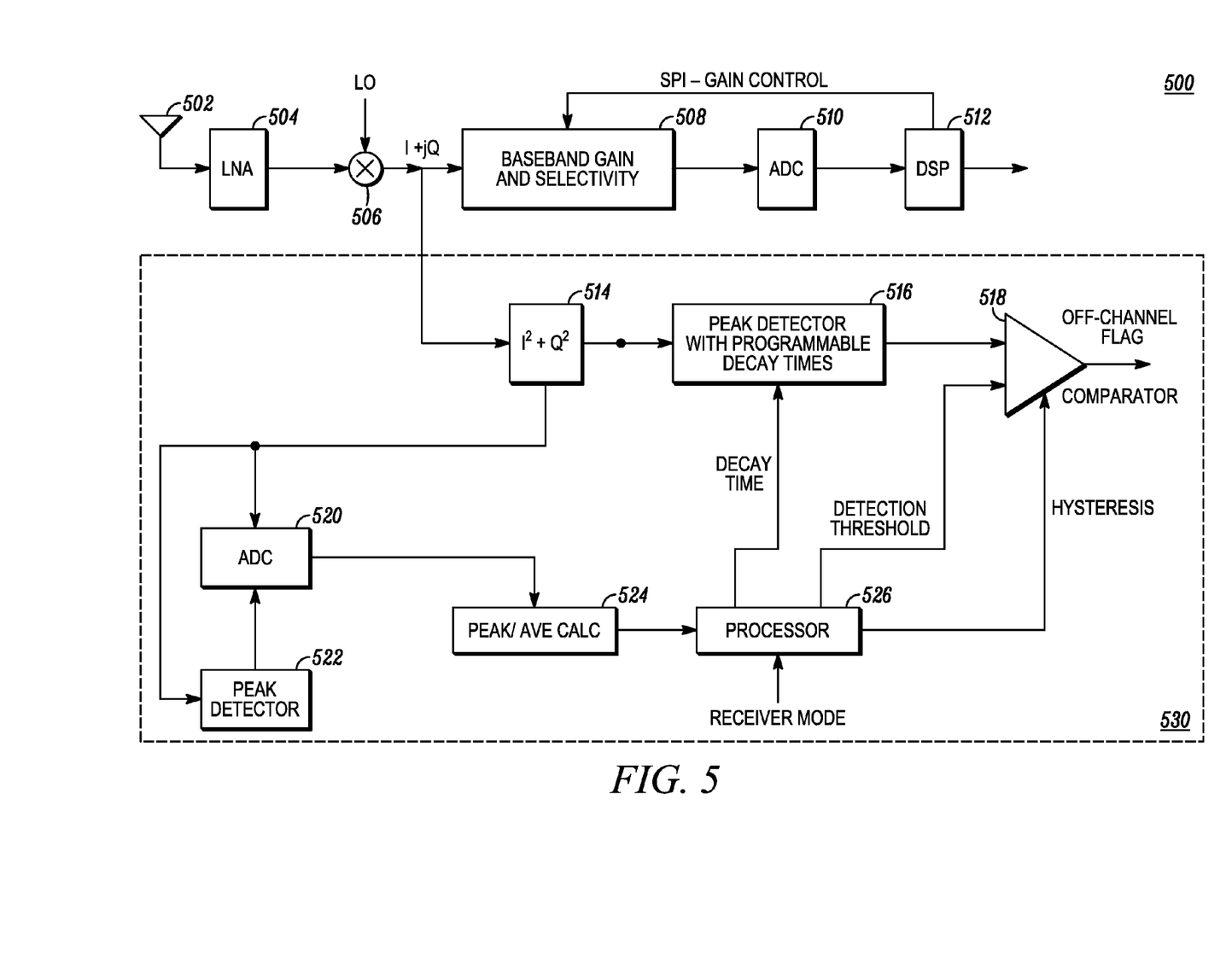
FIG. 5 shows a digital embodiment of a receiver containing an adaptive system.

The voltage from the energy estimator 514 is also provided to an ADC 520. The voltage from the energy estimator 514 is also provided to a peak detector 522. The peak detector 522 uses the slowest decay time and thus is able to estimate signal peak value. The digitized output from the ADC 520 is then supplied to a peak-to-average calculator 524. The ADC 520 may be, for example, a 2 channel ADC that supplies the digitized instantaneous energy and peak value serially. The ADC 520 samples the instantaneous energy and peak at a predetermined rate, e.g., 100 kHz. The peak-to-average calculator 524 calculates the peak to average ratio of the digitized voltage, and provides the result to a processor 526. The processor 526 then adjusts the decay time of the peak detector 516 and the predetermined threshold and the amount of hysteresis of the comparator 518 dependent on the peak to average ratio. As above, the processor 526 settings of decay time, threshold and hysteresis are also influenced by the type of on-channel signal. Although the ADC 520, peak detector 522, peak-to-average calculator 524, and processor 526 are shown in FIG. 5 as being separate modules, they may all be contained within the same microprocessor. In this case, the ADC 520, peak detector 522 and peak-to-average calculator 524 are implemented in software rather than hardware modules as shown in FIG. 5.

Figure 6:
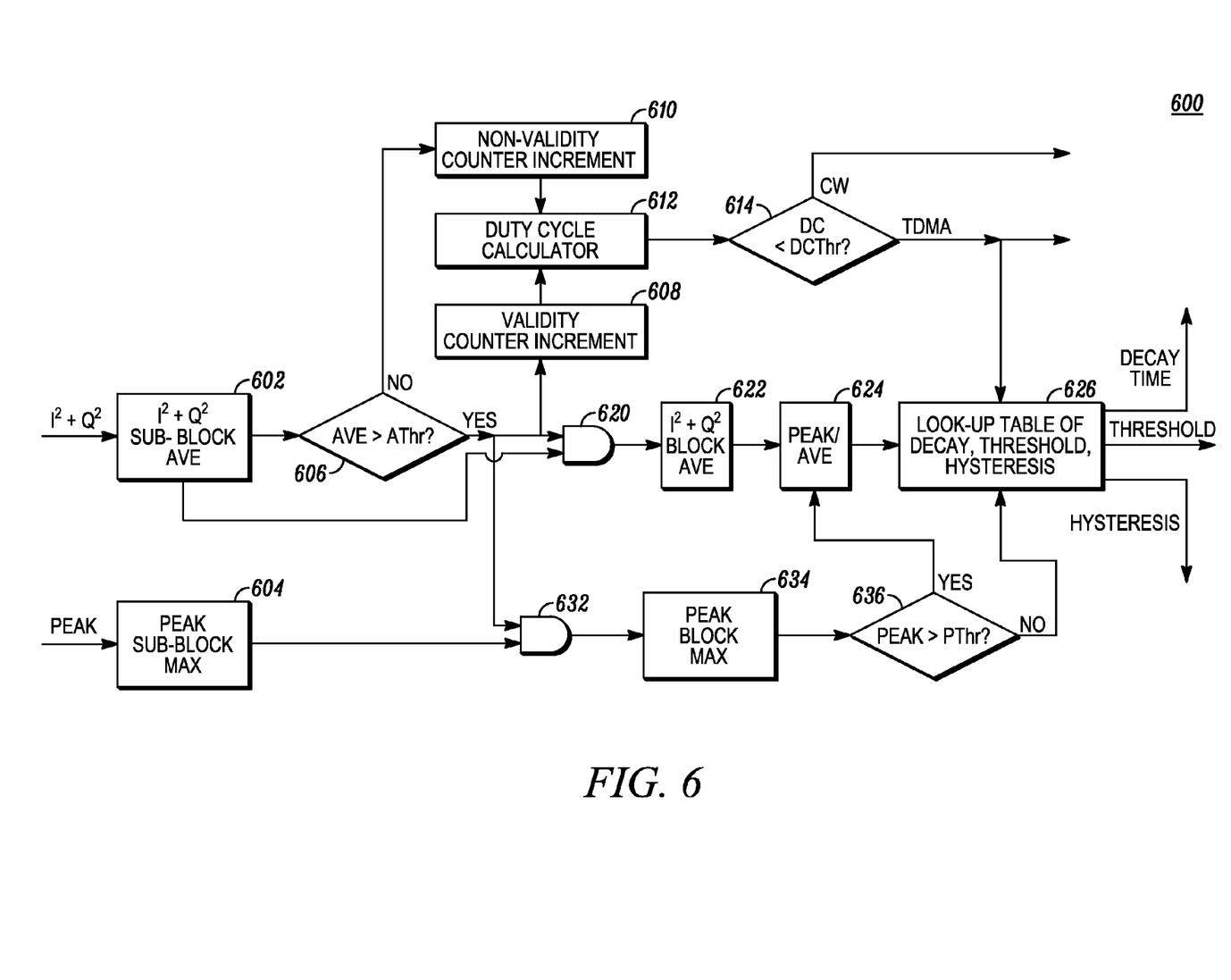
FIG. 6 shows an embodiment of an adaptive off-channel detector.

One embodiment of the manner in which the peak-to-average calculation and detection of whether the interfering signal is TDMA or continuous is accomplished is illustrated in the embodiment of the peak-to-average calculator 600 shown in FIG. 6. Both the instantaneous energy signal and the peak voltage are digitized. The instantaneous energy signal is buffered and then averaged over a pre-defined sub-block length in a sub-block averager 602. The sub-block length can be, e.g., from 1-128 digital samples. To determine the average, in one embodiment, the instantaneous signal is summed over all of the samples and the total is divided by the number of samples. For example, if the sub-block length is 128 samples, which are sampled at a rate of 100 kHz, the length of time to accumulate the desired average is 1.28 ms. The resulting average is compared to a pre-defined averaging threshold at a comparison module 606. The averaging threshold is set by one of the processors in the receiver and is representative of whether a signal is present. If the average is below the averaging threshold, the comparison module 606 signals a non-validity counter 610, which increments its count. The comparison module 606 discards the samples of this sub-block so that the average is not used in the later peak-to-average calculation. On the other hand, if the average is equal to or greater than the averaging threshold, the comparison module 606 signals a validity counter 608, which increments its count. The comparison module 606 forwards the samples of that sub-block so that the average is used in the peak-to-average calculation.

When the total number of counts (invalid plus valid) exceeds a particular amount, e.g., determined by the size of the buffer used to store the results, the numbers of invalid counts and valid counts are supplied to a duty cycle calculator 612. The buffer size may be, for example, several thousand sub-blocks. For example, the buffer size may be maximized at 32K sub-blocks, with each sub-block taking 1.28 ms=4.096 s. The duty cycle calculator 612 calculates the duty cycle of the interferer from the number of valid counts per unit time. The duty cycle is then provided to a TDMA decider 614, which determines whether the duty cycle is smaller than a TDMA threshold. If it is, the TDMA decider 616 determines that the interferer is a TDMA signal (as well as the type of TDMA signal—e.g., TETRA interferers have a duty cycle of 25%) and provides this information to the processor in the adaptive block. On the other hand, if the duty cycle is at least the TDMA threshold, the TDMA decider 616 determines that the interferer is a continuous signal and provides this information to the processor in the adaptive block.

Alternately, a single counter can be used to increment/decrement the count for each valid/invalid sub-block. In this case, if the result falls below a minimum threshold when the buffer is exceeded, the interferer is a TDMA signal while if the result equals or exceeds the minimum threshold, the interferer is a continuous signal.

The valid averages from the sub-block averager 602 are gated with the output from the comparison module 606 using a first and gate 620. The gated averages from the first and gate 620 are accumulated in a block averager 622 and averaged over the length of the block. The block length can be, e.g., from 1-128 sub-blocks. To determine the average, the averages are summed over all of the sub-blocks and the total is divided by the number of averages.

The digitized peak values are stored over the length of the sub-block and the maximum peak value is selected by a sub-block peak maximum selector 604. As above, the sub-block length can be, e.g., from 1-128 digitized samples. The maximum sub-block peak value may then optionally be gated with the output from the comparison module 606 using a second and gate 632. The maximum sub-block peak values are then stored over the length of the block and the maximum sub-block peak value is selected as the maximum block peak value by a block peak maximum selector 634. The block length can be, e.g., from 1-128 sub-blocks.

The maximum block peak value is then compared to a maximum peak threshold in peak comparison module 636. The maximum block peak threshold is predetermined and is related to the level of the off-channel interferer where the use of the off-channel detector is not to be employed (i.e., a low level off-channel interferer, at most, is present). If the maximum block peak value is greater than the maximum peak threshold, the peak-to-average ratio is calculated at a peak-to-average calculator 624. In one embodiment, the maximum block peak value is divided by the overall average of the stored averages determined by taking the total of the averages divided by the number of averages. In another embodiment, a reference voltage is supplied to the ADC along with the instantaneous energy and peak. This reference voltage may be averaged in the same manner as above and gated to the peak-to-average calculator 624 using the validity signal. The peak-to-average calculator 624 may then provide the ratio of the reference voltage less the maximum block peak value divided by the quantity of the reference voltage less the overall average.

The output of the peak-to-average calculator 624 is provided to a look-up table 626. If the maximum block peak value is not greater than the maximum peak threshold, the peak comparison module 636 signals the look-up table 626, which provides a predetermined signal to the processor to indicate that the adaptive off-channel detector is not needed and decay time, threshold and hysteresis are programmed to the default values. If the maximum block peak value is greater than the maximum peak threshold, the look-up table 626 programs the peak detector 516 and comparator 518 with decay time, threshold and hysteresis based on the look-up table 626. Similarly, if the signal is TDMA, the decay time of peak detector 516 is set to a predefined minimum.

In a different embodiment, to avoid a processor-intensive division operation, the numerator is compared to scaled values of the denominator. In this case, three different states exist: the ratio is less than the lower scaled value, the ratio is greater than the upper scaled value, and the ratio is between the upper and lower scaled value. In this case, one of three different parameters may be provided to the programmable peak detector and comparator. The three values are provided to another selector, where the particular parameters are selected using the state.

Figure 7:
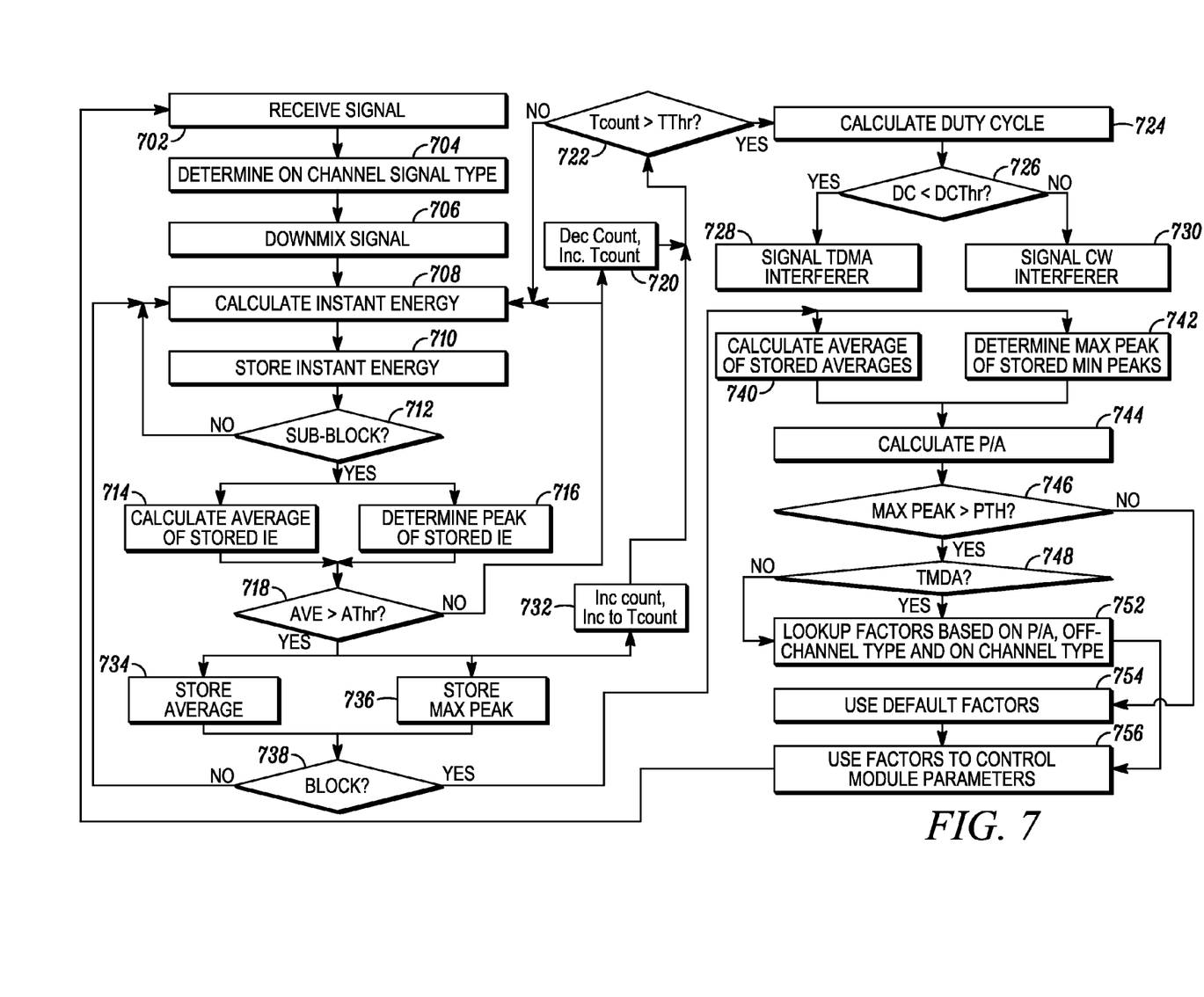
FIG. 7 shows a method of a receiver containing an adaptive off-channel detector system.

A flowchart describing one embodiment of operation of the receiver is shown in FIG. 7. A signal is received at step 702. The type of on-channel signal is determined at step 704. The on-channel signal can be preset and established as a default in the receiver, manually configured by the user or remotely, or automatically detected from the received signal or another control signal. The signal is converted to baseband at step 706 and the instantaneous energy derived at step 708. The voltage representing the instantaneous energy is converted to a digital form and continually stored at step 710 until at step 712 it is determined whether a sufficient number of samples (sub-block) have been retained. The number of samples is predetermined Once the predetermined number of samples has been stored, at step 714 the average of these stored values is calculated. At the same time, at step 716 the maximum of the peak values is determined. To determine the peak, the voltage is supplied to a peak detector that uses the slowest decay time.

Thus, given a voltage sequence 6, 5, 8, 6 for a sub-block of 4 samples, the voltage used would be that of the third sample −8.

At step 718, the average calculated at step 714 is compared to a predetermined threshold average value. If the average is less than the threshold average value, the average from the sub-block is not used in the overall peak-to-average calculation as this is an indication that there is insufficient signal strength in the received signal. Thus, the process returns removes the stored average and maximum values from memory and proceeds to the next sample, returning to step 708.

In parallel with returning to step 708, a validity count is decremented and a total count is incremented at step 720. The validity count indicates the number of sub-blocks containing valid signals. In one embodiment, each sub-block represents $1/128$ of time of one timeslot in a TDMA system. Thus, if the interferer signal is a TDMA signal, the signal will only be counted as valid in timeslots in which it is received. At step 722, the system decides whether a predetermined number of sub-blocks has been received in order to eventually determine whether the interferer is a TDMA or continuous signal. This number of sub-blocks, for example, can correspond to one frame (or a portion of a frame, e.g., several timeslots) in a TDMA system. If not, the system returns to step 708 as before. Similarly, if the average is not less than the threshold average value, the validity and total counts are incremented at step 732 and the process continues to step 722.

At step 722, if the system decides that the predetermined number of sub-blocks has been received, a duty cycle is calculated at step 724. The duty cycle may be calculated as the valid count divided by the total count. Once the duty cycle is calculated, these individual values may be reset. The duty cycle is compared to a predetermined duty cycle threshold (e.g., 90%) at step 726 and, if less than the predetermined duty cycle threshold it is decided at step 728 that the interferer is a TDMA signal while if not less that the predetermined duty cycle threshold it is decided at step 730 that the interferer is a CW signal. The results of these decisions are supplied to other portions of the receiver in addition to being used as described with relation to the adaptive system.

In parallel with the decision regarding the type of interferer, the parameters of the programmable modules are determined. Specifically, turning back to step 718, once it is decided that the average is not less than the threshold average value, the calculated average and maximum peak value from the sub-block are stored at steps 734 and 736, respectively. Each of these values are stored until it is determined at step 738 that a predetermined number of each has been retained (i.e., a predetermined number of sub-blocks with valid data has been obtained). This block of values can correspond in one embodiment to a frame or portion of a frame of a TDMA signal. The values stored in the block are used to calculate the average value over the entire block at step 740 and determine the maximum peak value for the entire block at step 742. The final peak-to-average ratio is determined at step 744 by dividing the maximum peak value over the block by the average value calculated over the block.

The system then determines the appropriate parameters to supply to the programmable peak detector and comparator. As shown in FIG. 7, the system determines at step 746 whether the maximum peak value exceeds a predetermined threshold, at step 748 whether the interferer is TDMA or continuous based on the result obtained at step 728/730. If the maximum peak value is not greater than the predetermined threshold then the off-channel detector is programmed with predetermined default values in 754. If, on the other hand, the maximum peak value is greater than the predetermined threshold as determined at step 746, then at step 752 a predefined lookup table is used to determine what decay, threshold and hysteresis to program into the off-channel detector. This lookup table is based on the calculated peak-to-average, on-channel expected signal type and whether interferer is TDMA or continuous. The default parameter values can be stored in the lookup table or can be supplied by a different processor (e.g., the DSP) and not overridden by the processor in the adaptive system. The parameter values to be used are supplied at step 756 to the programmable peak detector and comparator.

The type of interferer may be continually determined (i.e., every time the total count reached) or the indicated result may be maintained for a predetermined amount of time that is either independent of environmental/system conditions or predicated on such conditions. This is to say that if the system determines that a marked change in the interferer persists for some time, it may determine that it would be beneficial to re-decide the type of interferer. Similarly, the parameter values may be continually adjusted every block or may be maintained for a predetermined amount of time. While continually operating the adaptive system may improve margin, to reduce processing and conserve power (e.g., thereby saving battery life if appropriate), the adaptive system may be operated every N blocks for example (where N is an integer greater than 1).

As is clear, the processors in the various embodiments employ a number of inputs to determine the desired characteristics including decay time of the peak detector, threshold to compare the peak of the instantaneous energy and generate an off-channel signal and amount of hysteresis to minimize the instability of the off-channel signal. The characteristics are selected from a lookup table whose entries have been predetermined at the factory prior to placing the communication device (base station, mobile communication device) into service. The inputs include the instantaneous energy of the received signal, from which the peak and average values of the energy over a particular signal length are derived. These values are then used to calculate the peak-to-average ratio. The peak-to-average ratio and type of on-channel signal being received are used to select the appropriate stored characteristics.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

The invention claimed is:

1. A method of adaptively adjusting a receiver depending on an interferer, the method comprising configuring the receiver such that when a signal containing the interferer is received the receiver:

determines a signal metric of the signal over a predetermined time period;
   determines a type of interferer using the signal metric;
   selects, dependent on the signal metric and the type of interferer, a set of parameters from a table of parameters; and
   adjusts, dependent on the set of parameters, characteristics of other modules in the receiver that are used to generate an off-channel flag that provides an indication of the presence of the interferer.

2. The method of claim 1, wherein the signal comprises the interferer and an on-channel signal, the selection of the set of parameters is also dependent on a type of the on-channel signal.

3. The method of claim 1, wherein the characteristics of the other modules include decay time of a peak detector that detects a peak of the signal, a threshold with which to compare the peak, and amount of hysteresis of a comparator.

4. The method of claim 1, further comprising providing a default set of parameters if at least one of a predetermined threshold condition used in determining the signal metric is not met or the type of the signal is TDMA and valid data is not present.

5. The method of claim 1, wherein the signal metric is a peak-to-average of the signal.

6. The method of claim 5, wherein determining the peak-to-average of the signal comprises:
determining an instantaneous energy of the signal over the predetermined time period;
detecting a peak of the instantaneous energy over the predetermined time period;
digitizing at a sample rate the instantaneous energy and peak of the signal over the predetermined time period to produce samples of the instantaneous energy and peak of the signal;
calculating an average of the samples of the instantaneous energy;
selecting a particular peak of the samples of the peak of the signal; and
calculating the peak-to-average of the signal by dividing the average by the particular peak.

7. The method of claim 5, wherein determining the peak-to-average of the signal comprises:
determining an instantaneous energy of the signal over the predetermined time period;
detecting a peak of the instantaneous energy over the predetermined time period;
digitizing at a sample rate the instantaneous energy and peak of the signal over the predetermined time period to produce samples of the instantaneous energy and peak of the signal;
calculating an average of the samples of the instantaneous energy;
selecting a particular peak of the samples of the peak of the signal; and
calculating a range of peak-to-average values of the signal by determining whether the average is above, below or between limits that are each dependent on the particular peak.

8. The method of claim 7, wherein calculating a range of peak-to-average values comprises:
subtracting the particular peak from a digitized reference voltage to produce a first value and scaling the first value by different amounts to produce scaled first values;
subtracting the average from the digitized reference voltage to produce a second value and scaling the second value to produce a scaled second value;
comparing the scaled second value to the scaled first values.

9. The method of claim 8, wherein the set of parameters is selected from three possible sets of parameters dependent on whether the scaled second value is less than the smaller of the scaled first values, the scaled second value is less than the greater of the scaled first values, or the scaled second value is between the scaled first values.

10. The method of claim 6, wherein determining the type of interferer comprises:
determining whether the average over multiple sets of the samples is less than a predetermined average threshold;
adjusting a counter for each result of whether one of the averages is less than the predetermined average threshold; and
when a predetermined number of results have been obtained, calculating a duty cycle of the interferer using the counter and the predetermined number.

11. The method of claim 10, further comprising using only averages that are not less than the predetermined average threshold in calculating the peak-to-average ratio.

12. The method of claim 11, further comprising using only peaks in sets in which the averages are not less than the predetermined average threshold in calculating the peak-to-average ratio.

13. A receiver comprising:
a mixer configured to down-convert a received signal containing an on-channel signal and an interferer;
an energy estimator configured to estimate an instantaneous energy of the received signal;
at least one module configured to:
determine a signal metric of the received signal over a predetermined time period;
determine a type of interferer using the signal metric;
select, dependent on the signal metric and the type of interferer, a set of parameters from a memory containing multiple sets of parameters; and
adjust dependent on the set of parameters, characteristics of other modules that are used to generate an off-channel flag that provides an indication of the presence of the interferer.

14. The receiver of claim 13, wherein the received signal comprises the interferer and an on-channel signal, the at least one module configured to select the set of parameters further dependent on a type of the on-channel signal.

15. The receiver of claim 13, wherein the other modules comprise:
a peak detector configured to determine a peak of the received signal and whose decay time is dependent on the set of parameters, and
a comparator configured to compare the peak from the programmable peak detector with a threshold dependent on the set of parameters, the comparator having an amount of hysteresis dependent on the set of parameters.

16. The receiver of claim 13, wherein the signal metric is a peak-to-average of the signal, the at least one module comprising:
a peak detector configured to detect a peak of the instantaneous energy over the predetermined time period;
an analog-to-digital converter configured to digitize at a sample rate the instantaneous energy and peak over the predetermined time period to produce samples of the instantaneous energy and peak;
a peak-to-average calculator configured to calculate an average of the samples of the instantaneous energy, select a particular peak of the samples of the peak of the signal, and calculate a peak-to-average ratio of the received signal; and
a processor configured to select the set of parameters depending on the peak-to-average ratio.

17. The receiver of claim 16, wherein the peak-to-average calculator is configured to calculate a range of peak-to-average values of the received signal by determining whether the average is above, below, or between limits that are each dependent on the particular peak, and the set of parameters is selected from three possible sets of parameters dependent on whether the average is above, below, or between the limits.

18. The receiver of claim 16, wherein the at least one module is configured to determine the type of interferer by at least:
- determining whether the average over multiple sets of the samples is less than a predetermined average threshold;
- adjusting a counter for each result of whether one of the averages is less than the predetermined average threshold; and
- when a predetermined number of results have been obtained, calculating a duty cycle of the interferer using the counter and the predetermined number.

19. The receiver of claim 18, wherein the at least one module is configured to use at least one of only averages or only peaks that are not less than the predetermined average threshold in calculating the peak-to-average ratio.

* * * * *